United States Patent [19]
Lubbers et al.

[11] Patent Number: 5,774,643
[45] Date of Patent: Jun. 30, 1998

[54] ENHANCED RAID WRITE HOLE PROTECTION AND RECOVERY

[75] Inventors: Clark E. Lubbers; Susan G. Elkington, both of Colorado Springs; Ronald H. McLean, Elbert, all of Colo.

[73] Assignee: Digital Equipment Corporation, Maynard, Mass.

[21] Appl. No.: 542,536

[22] Filed: Oct. 13, 1995

[51] Int. Cl.$^6$ .................................................. C06F 11/10
[52] U.S. Cl. .............................. 395/182.18; 395/182.04; 711/114; 371/40.4
[58] Field of Search .................... 395/182.18, 182.17, 395/441, 182.04; 371/40.4

[56] References Cited

U.S. PATENT DOCUMENTS

| | | | |
|---|---|---|---|
| 4,434,487 | 2/1984 | Rubinson et al. | 371/10 |
| 5,124,987 | 6/1992 | Milligan et al. | 395/182.05 |
| 5,233,618 | 8/1993 | Glider et al. | 395/182.04 |
| 5,301,297 | 4/1994 | Menon et al. | 395/441 |
| 5,390,327 | 2/1995 | Lubbers et al. | 395/182.05 |
| 5,469,453 | 11/1995 | Glider et al. | 395/182.04 |
| 5,488,731 | 1/1996 | Mendelsohn | 395/800 |
| 5,504,858 | 4/1996 | Ellis et al. | 395/182.04 |
| 5,533,190 | 7/1996 | Binford et al. | 395/182.18 |
| 5,537,567 | 7/1996 | Galbraith et al. | 395/441 |
| 5,574,882 | 11/1996 | Menon et al. | 395/441 |
| 5,590,298 | 12/1996 | Kawamoto | 395/182.18 |

OTHER PUBLICATIONS

Patterson et al., "Introduction to Redundant Arrays of Inexpensive Disks (RAID)", IEEE, pp. 112–117, Apr. 1989.
Patterson et al., "A Case for Redundant Arrays of Inexpensive Disks (RAID)", ACM, pp. 109–116, Mar. 1988.

*Primary Examiner*—Robert W. Beausoliel, Jr.
*Assistant Examiner*—Scott T. Baderman
*Attorney, Agent, or Firm*—Cathy L. Peterson; Ronald C. Hudgens

[57] ABSTRACT

Disclosed is a method and apparatus for reconstructing data in a computer system employing a modified RAID 5 data protection scheme. The computer system includes a write back cache composed of non-volatile memory for storing (1) writes outstanding to a device and associated data read, and (2) storing metadata information in the non-volatile memory. The metadata includes a first field containing the logical block number or address (LBN or LBA) of the data, a second field containing the device ID, and a third field containing the block status. From the metadata information it is determined where the write was intended when the crash occurred. An examination is made to determine whether parity is consistent across the slice, and if not, the data in the non-volatile write back cache is used to reconstruct the write that was occurring when the crash occurred to insure consistent parity, so that only those blocks affected by the crash have to be reconstructed.

19 Claims, 7 Drawing Sheets

| SLICE # | BIT # | DISK DRIVE #1 | DISK DRIVE #2 | DISK DRIVE #3 | DISK DRIVE #4 | DISK DRIVE #5 (PARITY) |
|---|---|---|---|---|---|---|
| 1 | 7 | 1 | 0 | 1 | 1 | 1 |
| 2 | 6 | 0 | 1 | 1 | 0 | 0 |
| 3 | 5 | 0 | 1 | 0 | 0 | 0 |
| 4 | 4 | 1 | 0 | 1 | 1 | 1 |
| 5 | 3 | 0 | 0 | 1 | 0 | 1 |
| 6 | 2 | 1 | 0 | 0 | 1 | 0 |
| 7 | 1 | 1 | 0 | 1 | 1 | 1 |
| 8 | 0 | 0 | 0 | 0 | 1 | 1 |
| NUMBER | | 150 | 112 | 230 | 139 | |

| SLICE 0 | DISK DRIVE #1 LBN 21 | DISK DRIVE #2 LBN 25 | DISK DRIVE #3 LBN 29 | DISK DRIVE #4 LBN PARITY | DISK DRIVE #5 LBN 17 |
|---|---|---|---|---|---|
| ORIGINAL | 1 | 0 | 1 | 0 | 0 |
| MODIFIED | 1 | 1 | 1 | 1 | 0 |

*FIGURE 5*

| | DISK DRIVE #1 LBN 0 | DISK DRIVE #2 LBN 4 | DISK DRIVE #3 LBN 8 | DISK DRIVE #4 LBN 12 | DISK DRIVE #5 LBN PARITY |
|---|---|---|---|---|---|
| ON DISK ORIGINALLY | O1 | O2 | O3 | O4 | OP |
| WITH NEW DATA N1 | N1 | O2 | DRIVE MISSING LOST DATA etc. | O4 | NP |

ENHANCED RAID WRITE HOLE PROTECTION AND RECOVERY

CROSS-REFERENCES TO RELATED APPLICATIONS

This application is related to co-pending Application Ser. No. 08/542,827 "A RAID ARRAY DATA STORAGE SYSTEM WITH STORAGE DEVICE METADATA AND RAID SET METADATA," and assigned to the assignee of this invention, filed on even date herewith.

BACKGROUND OF THE INVENTION

1. Field of the Invention

The present invention relates to RAID (Redundant Arrays of Independent Disks) architecture and systems and more particularly relates to methods and apparatus for enhancing RAID write hole protection and recovery from system failures which would normally leave a "write hole".

2. Description of Related Art

The last twenty years have witnessed a revolution in information technology. Information handling and processing problems once thought to be insoluble, have been solved, and the solutions have become part of our daily lives. On-line credit card processing, rapid and reliable travel reservations completely automated factories, vastly improved weather forecasting through satellites, world wide Internet communications and many other breakthroughs all represent formidable computing challenges, yet all have become commonplace in our lives.

These challenges have been met and mastered in large part because of the rate of technological progress in the components that comprise computer systems:

Computers themselves have decreased in size from huge racks of equipment to units that can be placed on or beside a desk. While they have been shrinking physically, their capability to deliver cost effective high-performance computing has been doubling about every three years.

Graphical capabilities have progressed from the simple fixed-font character cell display to high-resolution multi-color displays, with advanced features such as three dimensional hardware assist becoming increasingly common.

Networks have proliferated. Low-cost, easily accessible communications capacity has grown from thousands of bits per second to tens of million bits per second, with billions of bits per second capability starting to appear on the horizon.

The shrinking computer has combined with the local area network to create client-server computing, in which a small number of very powerful server computers provide storage, backup, printing, wide area network access, and other services for a large number of desktop client computers.

The capabilities of the bulk data storage for these machines' are equally impressive. A billion bytes of magnetic storage, that thirty years ago required as much space and electrical power as a room full of refrigerators, can now be easily held in one's hand.

With these capabilities has come a dependence upon the reliable functioning of computer systems. Computer systems consisting of components from many sources installed at many locations are routinely expected to integrate and work flawlessly as a unit.

Redundant Arrays of Independent Disks, or RAID technology is sweeping the mass storage industry. Informed estimates place its expected usage rate at 40% or more of all storage over the next few years.

There are numerous RAID techniques. They are briefly outlined below. A more thorough and complete understanding may be had by referring to "The RAIDbook, A Source Book for Disk Array Technology" the fourth edition of which was published by the RAID Advisory Board (RAB™), St. Peter, Minn.

The two most popular RAID techniques employ either a mirrored array of disks or striped data array of disks. A RAID that is mirrored presents very reliable virtual disks whose aggregate capacity is equal to that of the smallest of its member disks and whose performance is usually measurably better than that of single member disk for reads and slightly lower for writes.

A striped array presents virtual disks whose aggregate capacity is approximately the sum of the capacities of its members, and who's read and write performance are both very high. The data reliability of a striped array's virtual disks, however, is less than that of the least reliable member disk.

Disk arrays may enhance some or all of three desirable storage properties compared to individual disks:

They may improve 1/0 performance by balancing the I/O load evenly across the disks. Striped arrays have this property, because they cause streams of either sequential or random I/O requests to be divided approximately evenly across the disks in the set. In many cases, a mirrored array can also improve read performance because each of its members can process a separate read request simultaneously, thereby reducing the average read queue length in a bus system.

They may improve data reliability by replicating data so that it not destroyed or inaccessible if the disk on which it is stored fail. Mirrored arrays have this property, because they cause every block of data to be replicated on all members of the set. Striped arrays, on the other hand do not, because as a practical matter, the failure of one disk in a striped array renders all the data stored on the array virtual disks inaccessible.

They may simplify storage management by treating more storage capacity as a single manageable entity. A system manager who managing arrays of four disks (each array presenting a single virtual disk) has one fourth as many directories to create, one fourth as many user disk space quotas to set, one fourth as many backup operations to schedule etc. Striped arrays have this property, while mirrored arrays generally do not.

With respect to classification (sometimes referred to as levels), some RAID levels are classified by the RAID Advisory Board (RAB™) as follows:

Very briefly, a RAID 0 employs striping, or distributing data across the multiple disks of an array of disks by striping. No redundancy of information is provided but data transfer capacity and maximum I/O rates are very high.

In RAID level 1, data redundancy is obtained by storing exact copies on mirrored pairs of drives. RAID 1 uses twice as many drives as RAID 0, has a better data transfer rate for read but about the same for write as to a single disk.

In RAID 2, data is striped at the bit level. Multiple error correcting disks (Data protected by a Hamming code) provides redundancy, a high data transfer capacity for both read and write, but because multiple additional disk drives are necessary for implementation, not a commercially implemented RAID level.

In RAID level 3: Each data sector is subdivided and the data is striped, usually at the byte level across the disk drives, and one drive is set aside for parity information. Redundant information is stored on a dedicated parity disk. Very high data transfer, read/write I/O.

In RAID level 4, data is striped in blocks, and one drive is set aside for parity information.

In RAID 5, data and parity information is striped in Blocks and is rotated among all drives on the array.

Because RAID 5 is the Raid level of choice, it shall be used in the following discussion. However, much of what follows is applicable to other RAID levels, including RAID levels 6 et seq., not discussed above. The invention is particularly applicable to Raid levels employing a parity or ECC form of data redundancy and/or recovery.

Raid 5 uses a technique (1) that writes a block of data across several disks (i.e. striping), (2) calculates an error correction code (ECC, i.e. parity) at the bit level from this data and stores the code on another disk, and (3) in the event of a single disk failure, uses the data on the working drives and the calculated code to "Interpolate" what the missing data should be (i.e. rebuilds or reconstructs the missing data from the existing data and the calculated parity). A RAID 5 array "rotates" data and parity among all the drives on the array, in contrast with RAID 3 or 4 which stores all calculated parity values on one particular drive. The following is a simplified example of how RAID 5 calculates ECCs (error correction codes, or commonly referred to as parity), and restores data if a drive fails.

Figure 1:
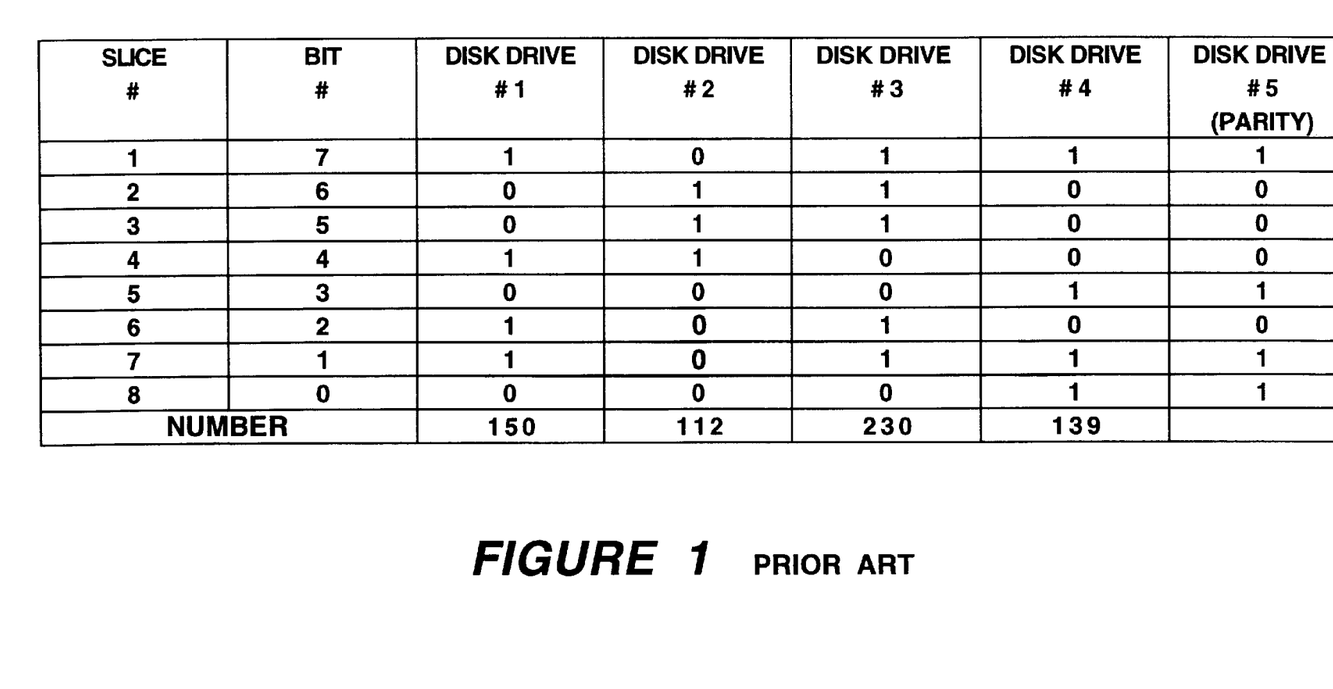
FIG. 1 is a table illustrating how parity is determined in a five disk drive array for a RAID set.

By way of example, and referring to the prior art drawing of FIG. 1, assume a five-drive disk array or RAID set on which it is intended to store four values, e.g. the decimal numbers 150, 112, 230, and 139. In this example, the decimal number 150 is binary 10010110 and is to be written on disk 1. The number 112 as binary number 01110000 to be written on disk 2, the number 230 or binary number 11100110 on disk 3 and the number 139 as binary number 10001011 on disk 4. When the four values are written to disks 1–4, the RAID controller examines the sum of each bit position, in what is called a slice. If the sums of the bit position is an odd number then the odd number 1 is assigned as the parity number; if the sum is an even number, then that is designated an even number, "0". (It should be noted that if a reconstruct algorithm (RW) is employed, the parity may be calculated prior to any writes and that writes are done essentially in parallel and simultaneously. Thus when the calculation for parity is accomplished is primarily a function of the choice of algorithm as well as its precise implementation in firmware.) Another way in which parity is determined, as will be more fully exemplified below, is to exclusive OR [Xor] the first two consecutive bits of a slice, Xor the result with the next bit and so on, the Xor with the final bit of the last data-carrying-drive being the parity. However, it should be recognized that the process of determining parity is commutative, that is the order of Xoring is unimportant.

Assume disk 2 fails, in the example of FIG. 1. In that event, the following occurs. The RAID disk controller no longer ascertains that the value of bit 7 is a 0 on disk 2. However, the controller knows that its value can be only a 0 or a 1. Inasmuch as disks 1, 3, 4 & 5 are still operating, the controller can perform the following calculations: 1+?+1+ 1=an odd number, or 1. Since 1+0+1+1= an odd number, then the missing value on disk 2 must be a 0. The RAID controller then performs the same calculation for the remaining bit positions on disk 2, In this way data missing due to a drive failure may be rebuilt. Another, and often more convenient way of determining the missing value, i.e. a 0 or a 1, is by Xor'ing the parity with the data bit on drive #1, Xoring the result with the data bit on drive #3 and then Xor'ing that result with the data bit on drive #4. The result is the missing data bit which is attributable to that missing bit in slice 1 on drive 2. This activity continues for each bit of the block. Once again, inasmuch as the process of determining parity is commutative, that is the order of Xoring is unimportant, the order of making the determination is unimportant.

This reconstruction is accomplished by the RAID controller, in conjunction with array management software, which examines the sum of each BIT position to assign an even or an ODD number to disk 5. If a disk fails a 0 or a 1 is assigned to the missing value and a simple calculation is performed. The missing bit is the Xor of the members including parity. This process is repeated, and the data is rebuilt. If a disk drive (#2 in the example) has failed, and information on that disk is called for by the user, the data will be built on the fly and placed into memory until a replacement drive may be obtained. In this manner, no data is lost. By way of definition, "consistent parity" is the parity as recorded on the media which is the Xor of all the data bits as recorded on the media. It should be understood that in the event that the data from one of the members becomes unavailable, that data can be reconstructed if the parity is consistent.

A write hole can occur when a system crashes or there is a power loss with multiple writes outstanding to a device or member disk drive. One write may have completed but not all of them, resulting in inconsistent parity. Prior solutions have been to reconstruct the parity for every block. Since this is accomplished at the bit level, as may be imagined, this can be very time consuming if billions of bits are involved.

SUMMARY OF THE INVENTION

In view of the above, it is a principal object of the present invention to provide a technique, coupled with apparatus, for inhibiting write hole formation while facilitating recovery of "write holes".

Another object of the present invention is to provide a method of marking new data prior to its being written as well as storing old data which permits localized reconstruction of data without having to reconstruct the entire array of disks when a crash or failure occurs.

Yet another object of the present invention is to provide means for quickly identifying possible bad data blocks and write holes and permitting the most expeditious recovery including possible reconstruction from precautionary measures taken prior to the crash or failure of the system.

These and other objects are facilitated by employing a nonvolatile write back cache and by storing the metadata information in nonvolatile memory as well. Cached metadata includes at least three fields. One field contains the LBN (and thus the Logical Block Address [LBA]) of the material to be written, another field contains the device ID, and the third field contains the block status (dirty, clean, inconsistent parity on slice, parity valid). [Hereinafter, crash = an unintentional power or function cessation, which could be from a controller, cache, memory drive, computer system etc. unexpectedly ceasing operation due to power loss, failure etc.] In the instance where a crash occurs during a "write" to disk, it is possible the "write" wrote some, but not all, of the data blocks and the parity block. This results in inconsistent parity across the slice. Since a write-back cache which is non-volatile is employed, the data that was to be written is still retained, and by use of the metadata information which is also saved in non-volatile memory, where the write was intended is known. Thus the write that was occurring when the crash took place can now be reconstructed and it can be insured that the parity is consistent. In this manner only the blocks affected by the crash may be corrected, and parity for every block does not have to be recalculated.

Other objects and a more complete understanding of the invention may be had by referring to the following description taken in conjunction with the accompanying drawings in which:

DESCRIPTION OF THE ILLUSTRATIVE EMBODIMENT

Figure 2:
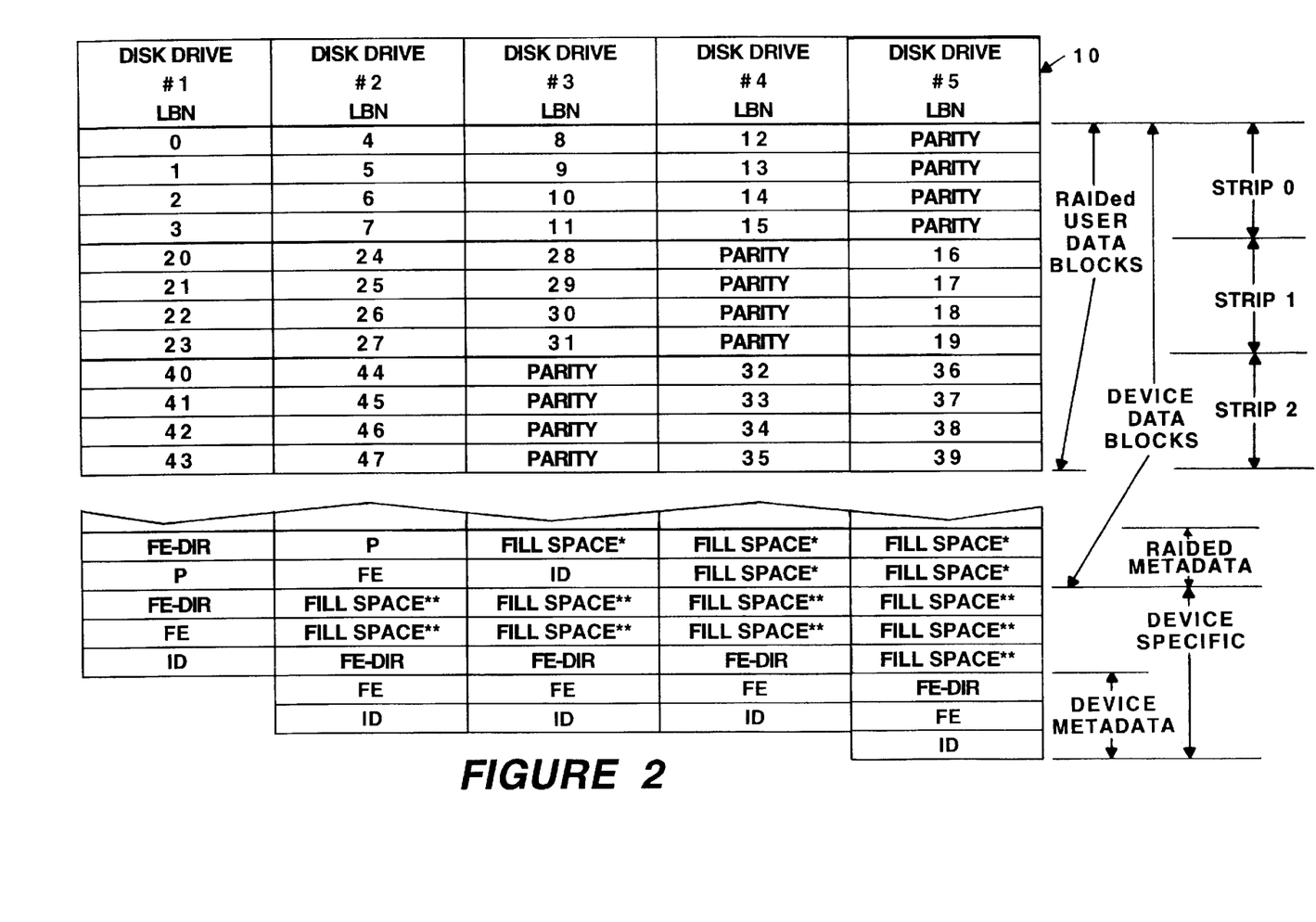
FIG. 2 is a table showing a five disk drive array for a RAID level 5 architectured RAID set, with striping of data and parity, and including the hidden or metadata blocks of information for both devices and the RAID set.

Referring now to the drawings and especially FIG. 2, a typical five member RAID Array 10 is depicted in the table, each member disk drive being labeled #1–#5 respectively across the top of the table. As was discussed above with reference to FIG. 1, a slice extends, at the bit level, across members or disk drives of the Array. In a Raid 5 device, the data is placed on the disks in blocks, for example each of 512 bytes and given a Logical Block Number (LBN). For example, as shown in the table of FIG. 2, block 0, drive #1, block 4, drive #2, block 8 drive #3, block 12, drive #4 and parity in an unnumbered block in drive #5. (Note that each block that contained the error code information [parity] would be numbered with a SCSI [Small Computer System Interface] number, all blocks in a single drive being numbered consecutively, but for purposes of discussion and simplification have not been given an assignment number herein. Thus the numbered blocks, i.e those numbered in the table and labeled LBN, represent data.) A single "slice" would be a single bit of each of block 0, 4, 8, 12 and a parity bit. Accordingly there would be 512 bytes times 8 bits/byte slices of bit size data. A "chunk", is defined as the number of blocks placed on one drive before the next LBN block of data is written on the next drive. In the illustrated instance in FIG. 2, a chunk includes 4 blocks and a "strip", while capable of being defined a number of ways, is shown as being 4 blocks in depth times 5 drives or really 16 blocks of data plus 4 blocks of parity information. (In the example or sample shown in FIG. 4, a chunk is equal to two blocks; a strip is equal to 8 data blocks and two parity blocks.) Thus strip 0 in FIG. 2 includes user data blocks, or LBN's, of 0–15+four parity blocks, while strip 1 includes LBN's of 16–31 plus 4 parity blocks, and Strip 2 includes LBN's of 32–47 with four blocks of parity, and so on. As is shown in the abbreviated table of FIG. 2, the Raid is called a "left symmetric rotate" because the four high (sometimes referred to as "deep") parity blocks move around from drive #5 in strip 0 to drive #4 in strip one to drive #3 in strip 3 and so on. Notice also that the LBN continues its numbering sequence in the same spiral fashion, LBN 16–19 being written in strip 1 to drive #5, and continuing through drive #1 (LBN 20–23), through LBN 31 appearing in drive #3.

Every disk drive carries certain extra information on it to permit identification of the disk drive, as well as other pertinent information. Each drive, at the lower extent of the table in FIG. 2, includes device specific information, including an ID block, an FE block, and an FE-Dir block. Note that the total lengths of the blocks under each drive are representative of the size or capacity of each drive. For example, disk drive #1 is the smallest drive, disk drives #2–#4 are the same size, and disk drive #5 is the largest capacity drive. Because drives are interchangeable, and a large drive can be used in an array with smaller capacity drives, a substitute or spare disk drive can be installed in the RAIDset as long as the substitute drive has at least as much capacity as the smallest drive in the RAIDset at the time of its creation. The rest of the spaces are not used by the user, and are considered and labeled "Fill Space**".

Turning now to the device specific information carried by each of the drives, and as illustrated in FIG. 2, the lowest boxes labeled "ID" and associated with each of Drives #1–#5 representatively contain such information as RAID membership information, (order, serial number of all members, EDC on ID information to protect metadata format) This informaton is contained in data blocks on the disk and are readable by the disk controller. This is included as part of the device or member metadata illustrated in FIG. 2 . Part of the device or member metadata is a forced error box labeled FE, one such box being associated with each disk drive #1–#5. The FE box represents one or more blocks of data. Within the FE blocks are a single bit per device data block, i.e. LBN and parity. Anotherwords, each data block on each of the drives has an FE bit. The single bit represents whether the associated block can be reliably used in Xor calculations. If the bit is 'set', (e.g. a "1"), as will be explained hereinafter, the data block is considered bad as to its reliability, and therefore the block, or any of its bits, cannot be used for Xor calculations. There are enough blocks of FE bits to represent all blocks in the device, including the "Fill Space" of larger devices, but not the metadata itself. The third and last box, which includes, especially with larger drives, several blocks of data written on each disk or device and labelled "Forced Error Directory Blocks", or FE-Dir. Each FE-Dir block contains 1 bit for every block (512 bytes in our example) of forced error bits. This block is used for a quick lookup of suspect data or parity blocks. If a bit is not set, then there are no forced errors in the Logical Block Address (LBA) range the FE block covers. For faster lookup, the FE-DIR information is cached in the controller cache. (Described hereinafter).

One other group of blocks which exists and are written to the disks, are those containing RAIDed metadata. These blocks contain much the same information as in the individual device metadata blocks of information, with the exception that since they are RAIDed, parity is employed so that information can also be recovered here, if a block of data or parity as such is considered bad, or a drive is removed etc. The ID box in the RAIDed Metadata representatively contains RAIDset information (serial number, size), and EDC on ID information to protect the metadata format. The RAIDed forced error "FE" bits still employ 1 bit per RAIDed user data block, representing whether a block is suspect and its data cannot be relied upon. (This does not mean it is unusable, as with the device specific metadata FE block, only unreliable or suspect.) The Forced Error Directory box, which representatively may contain multiple disk blocks, contains 1 bit per disk block of forced error bits. Like its device specific partner FE-DIR, it is used for quick lookup of suspect blocks. Moreover, if there is any fill space in the RAIDed Metadata strip, this fill will take up the extra space to the stripe boundary. These blocks have been labeled Fill Space*, (note the single asterisk to denote RAIDED area fill Space).

Forced error promotion occurs when two blocks within a strip have unrecoverable read errors or corresponding device FE bits set. For example, suppose block 6 and the parity block in Strip 0 are unreadable. This means that there is no longer redundancy for blocks 2, 10 and 14. In order to regain redundancy, the following procedure may be employed: Write the RAIDed FE bit corresponding to the user data block lost in strip 0; (if there were more data blocks lost, write 0 to all lost data blocks); Calculate parity, including the zeroed block just written, and good data blocks 2, 10 and 14; Write the parity block; and clear parity block's device FE, and the lost data blocks device FE. The RAIDed FE bit set denotes that block 6 has been lost. A subsequent write of block 6 will write correct data with full redundancy and clear the RAIDed FE bit. It is the time from when block 6 has been lost to the point that it has again written with new good data when forced error promotion in RAID is quite useful. FE promotion allows the remaining other 'good' blocks of data to be provided with full RAID-5 data integrity even in the face of multiple block errors existing within the strip of a RAID set.

For other information on fast initialization and additional material on metadata, and for a more complete understanding of the RAIDed Metadata, patent application Ser. No. 08/542,827, filed on even date herewith, entitled "A RAID ARRAY DATA STORAGE SYSTEM WITH STORAGE DEVICE METADATA AND RAID SET METADATA" and assigned to the assignee of this invention, is hereby incorporated by reference.

Figure 3:
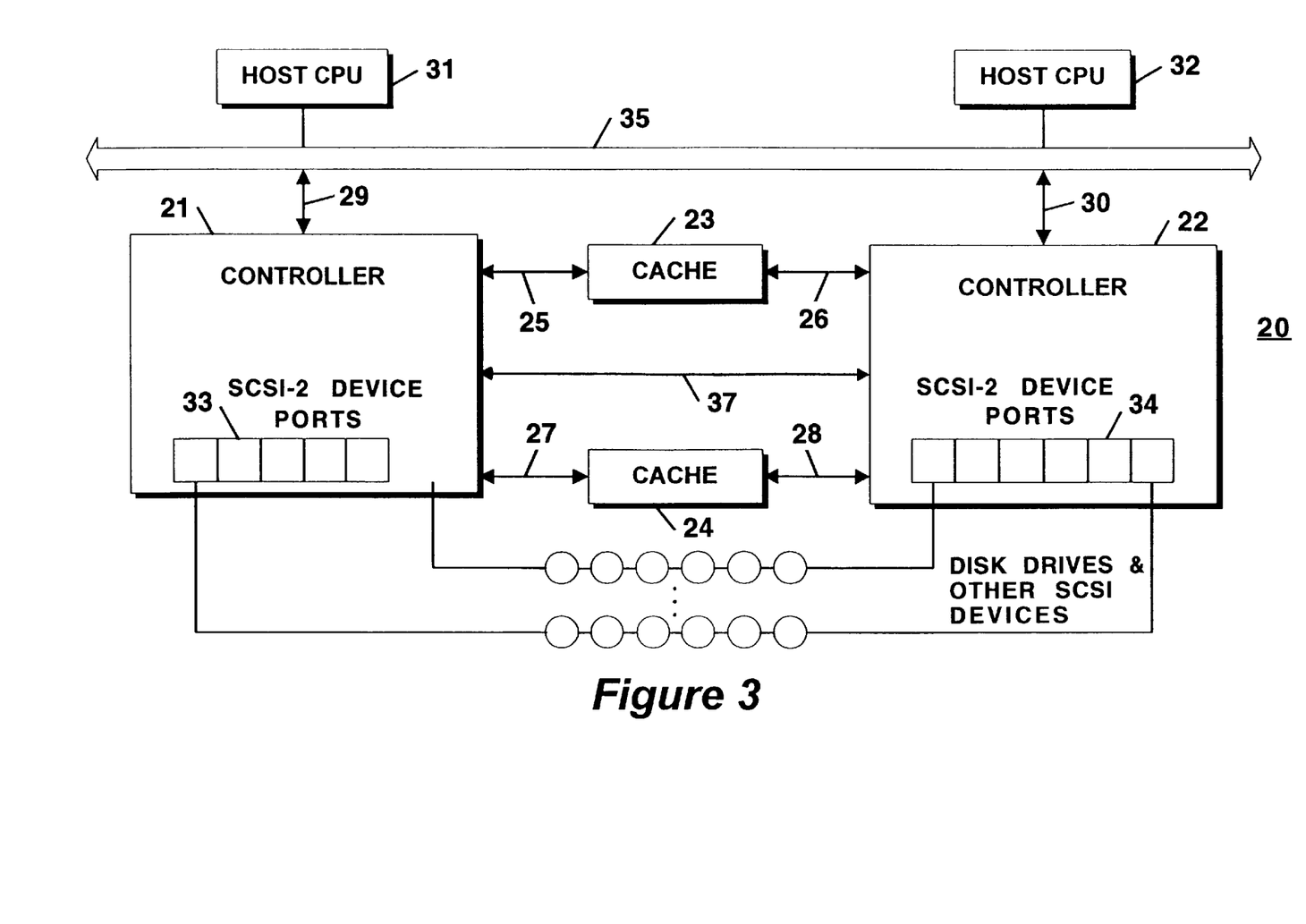
FIG. 3 is a block diagram illustrating a preferred redundant controller and cache arrangement which may be employed in accordance with the present invention.

Turning now to FIG. 3, a system block diagram is shown including a dual-redundant controller configuration 20. The configuration may contain StorageWorks™ components, HS-series controllers manufactured by Digital Equipment Corporation. As shown, each controller 21, 22 is connected to its'own cache 23 and 24, each with bidirectional lines 25, 26 and 27, 28. Each controller 21, 22 is connected in turn through I/O lines 29 and 30 respectively to a host interface 35, which may include a backplane for power-supply and bus connections and other things as discussed below. One or more host computers or CPU's 31 and 32 may be connected to the host interface 35. The backplane includes intercontroller communication, control lines between the controllers and shared SCSI-2 device ports such as shown schematically at 33 and 34. . Since the two controllers share SCSI-2 device ports the design enables continued device availability if either controller fails.

Although not shown in the drawing, the commercial unit mentioned above includes in the backplane a direct communication path between the two controllers by means of a serial communication universal asynchronous receiver/transmitter (UART) on each controller. The controllers use this communication link to inform one another about controller initialization status. In a dual-redundant configuration, such as the configuration 20 shown in FIG. 3, a controller that is initializing or reinitializing sends information about the process to the other controller. Controllers send keep alive messages to each other at timed intervals. The cessation of communication by one controller causes a "failover" to occur once the surviving controller has disabled the other controller. In a dual-redundant configuration, if one controller fails, all attached storage devices continue to be served. This is called "failover". Failover occurs as has been previously mentioned, because the controllers in a dual-redundant configuration share SCSI-2 device ports and therefore access to all attached storage devices. If failover is to be achieved, the surviving controller should not require access to the failed controller. The two way failover communication line 37 is depicted in FIG. 3.

StorageWorks™ controllers in a dual redundant configuration have the same configuration information at all times. When configuration information is entered into one controller that controller sends the new information to the other controller. Each controller stores this information in a controller resident nonvolatile memory. If one controller fails, the surviving controller continues to serve the failed controller's devices to host computers, thus obviating shared memory access. The controller resolves any discrepancies by using the newest information.

Specific firmware components within a controller can communicate with the other controller to synchronize special events between the hardware on both controllers. Some examples of these special events are SCSI-2 bus resets, cache state changes, and diagnostic tests.

Each controller can sense the presence or absence of its cache to set up cache diagnostics and cache operations and can sense the presence or absence of the other controller's cache for dual-controller setup purposes.

The failover of a controller's cache occurs only if write-back caching was in use before the controller failure was detected. In this case, the surviving controller causes the failed controller's cache to write its information into the surviving controllers cache. After this is accomplished, the cache is released and access to the devices involved is permitted. The cache then awaits the failed controller's return to the dual-redundant configuration through reinitialization or replacement.

If portions of the controller buffer and cache memories fail, the controller continues normal operation. Hardware error correction in controller memory, coupled with advanced diagnostic firmware, allows the controller to survive dynamic and static memory failures. In fact, the controller will continue to operate even if a cache module fails. For more information concerning the design and architecture of HS-series StorageWork™ array controllers, see Vol. 6, No. 4, Fall 1994 (published 1995) issue of the "Digital Technical Journal", page 5 et. seq.

Figure 4:
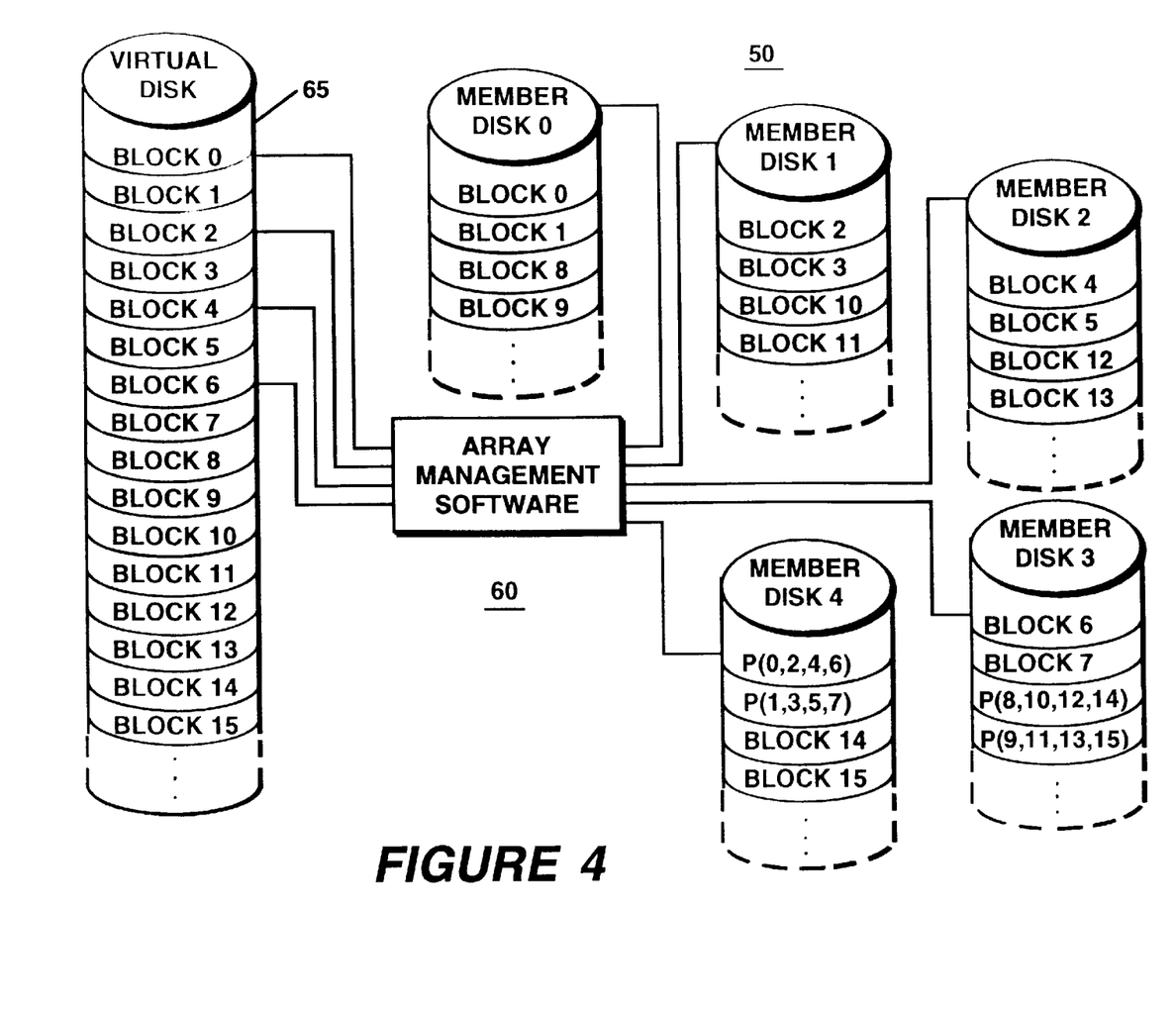
FIG. 4 is a diagrammatic representation of sample data mapping for a RAID level 5 array, illustrating two block high data striping with interleaved parity and left symmetric parity rotation, and which also shows the relationship between the "array management software", the virtual disk and the member disks of the array.

Referring now to FIG. 4, shown is a diagrammatic representation of sample data mapping for a RAID level 5 array 50, illustrating two block high data striping (as opposed to four in FIG. 2) with interleaved parity and left symmetric rotation, and which also shows the relationship between the "array management software" 60, the virtual disk 65, and the member disks 1–5 of the array 50. RAID level 5 in its pure form was rejected because of its poor write performance for small write operations. Ultimately chosen was RAID level 5 data mapping (i.e., data striping with interleaved parity, as illustrated in FIGS. 2&4) coupled with dynamic update algorithms and writeback caching via the redundant caches 23, 24 in the redundant controllers 20 (FIG. 3) to overcome the small-write penalty.

The Array Management Software 60 manages several disks and presents them to a host operating environment as virtual disks with different cost, availability, and performance characteristics than the underlying members. The Software 60 may execute either in the disk subsystem or in a host computer. Its principal functions are:

(1) to map the storage space available to applications onto the array member disks in a way that achieves some desired balance of cost, availability, and performance, and, (2) to present the storage to the operating environment as one or more virtual disks by transparently converting I/O requests directed to a virtual disk to 1/0 operations on the underlying member disks, and by performing whatever operations are required to provide any extraordinary data availability capabilities offered by the array 50.

Parity RAID array 50 appears to hosts, such as the host computers 31 and 32, as an economical, fault-tolerant virtual disk unit such as the virtual disk 65, where the blocks of data appear consecutively (by their LBN) on the drive as shown in FIG. 4. A Parity RAID virtual disk unit with a storage capacity equivalent to that of n disks requires n+1 physical disks to implement. Data and parity are distributed (striped) across all disk members in the array, primarily to equalize the overhead associated with processing concurrent small write requests.

As has previously been explained with respect to FIG. 1, if a disk in a Parity RAID array fails, its data can be recovered by reading the corresponding blocks on the surviving disk members and performing a reconstruct, data reconstruct or reconstruct read (using exclusive-OR [Xor] operations on data from other members).

Recalling that a slice is said to be consistent when parity is the "exclusive or" (Xor) of all other bits in that slice, there are three principal algorithms to be considered for modifying data and parity and reconstructing data and parity when it is desired to modify the same or there is a failure causing the RAID set or a portion thereof to fail. When information is to be written to a disk drive or particular LBN, (1) a Read, Modify and Write algorithm (RMW) is employed when parity is consistent and data is being written for some or a small subset of the members, (2) a Reconstruct Write (RW) algorithm is employed when most or all of the members are being written, and (3) Non-Redundant Write (NRW) is utilized when when the member or drive containing the parity data is missing.

Start with a consistent slice (i.e. parity is correct), and it is desired to write new data into a block. That means a new parity for each effected slice must be constructed. Assume that the RMW algorithm is going to be employed. The algorithm is the Xor of the old data with the new data, and the result Xor'd with the old parity to create the new parity. By way of example, and referring now to FIG. 5, suppose LBN 25 in FIG. 2 was to be modified. Suppose the bit written in slice 0 of the old data block (LBN 25) is 0, but the first bit in the modified slice in data block LBN 25 is 1. An Xor of the old bit (0) and the new bit (1) gives 1. Xoring the result (1) with the old parity of 0 changes the parity for the entire slice from 0 to 1. Of course if the new bit state and the old bit state are the same, no change will occur in the parity. Thus there is no necessity of examining (reading) any of the other bits of the other LBN's in slice 6 to determine and write the new parity. Knowing only the state of the old data, the new data and the old parity, one can determine the new parity. The new data and the new parity may be then written to the disk.

The problem of a write hole occurs when writing new or modified data to an old block and/or writing a new parity and a crash, or power outage occurs, and one write is successful and the other write doesn't take place. This is when the parity is said to be "inconsistent". The problem in the industry is that when a crash occurs in the middle of a write, if there was no recording of what was being done, the standard or conventional manner of proceeding is to examine or reparity the entire disk and really the entire RAID set. The purpose of the parity is to be able to reconstruct the data on a disk when the disk crashes. So if parity is inconsistent, data cannot be properly reconstructed. If it is not known which data can be relied upon or if there is trash in one or more LBN's associated with the inconsistent parity, then the material may be impossible, without more, to recover. It should also be noted that the occurance of a write hole when a RAIDset is reduced (drive missing and not replaced) can lead to the loss of data from the missing member. This is because the missing data is represented as the Xor of the data from the remaining members and in no other way. If one write succeeds and one does not, this Xor will produce invalid data. Thus the present invention not only allows us to make parity consistent quickly reducing the probability of losing data but prevents loss of data due to write holes while a RAIDset is reduced.

To eliminate this write hole, designers had to develop a method of preserving information about ongoing RAID write operations across power failures such that it could be conveyed between partner controllers in a dual-redundant configuration. Non-volatile caching of RAID write operations in progress was the manner determined to be of most use to alleviate the problem not only in dual-redundant configuarions, but in single controller operations.

So one of the problems is to where, if anywhere, the parity is inconsistent, and the other problem is if the system crash causes the disk drive to fail, or if the array is reduced, (i.e. one drive missing) it is essential to know that your parity is consistent so that the reduced, failed etc. drive data may be reconstructed, merely by Xoring the appropriate or remaining bit for each remaining member in each slice. In a striped RAID 5, such as our example in FIG. 2, (or in FIG. 4) the loss of a drive would of necessity include data and parity. For example, if drive 5 in the table of FIG. 2 fails, the parity for strip 0 and data for strips 1 and 2 will be lost. However, the lost data for each slice may be recreated or reconstructed by simply Xoring the remaining LBN's. Another way to look at a write hole is that if all of the writes succeed before a failure, and as long as this is known, then parity will be known to be consistent. The same is true if none of the writes commanded are made before the RAID set is interrupted by a power outage, loss of a drive etc, then the parity will be consistent. In each of those instances, a write hole problem exists when it is not known whether parity is consistent (that either all writes succeeded or no writes were issued). A write hole problem thus occurs when updating more than one member (drive) and not all of the writes succeed or insufficient knowledge is obtainable so that it is not evident that a write has or has not succeeded.

Double failures may also occur. Power failures that cause, upon resumption of power, a loss of a drive, are considered double failures, its data where ever the system was writing, is missing and could be lost if you do not know whether the writes were complete, partially complete etc.

In accordance with the invention, by first recording all writes and selected "old information" to non-volatile memory and recording those writes and old data status, so that what is known is not only the data, but where it is going, and the state of the data. Given this information, parity can be made consistent or data recovered even when a drive was missing prior to or lost during a power failure that occurred while RAID writes were in progress.

Figure 5:
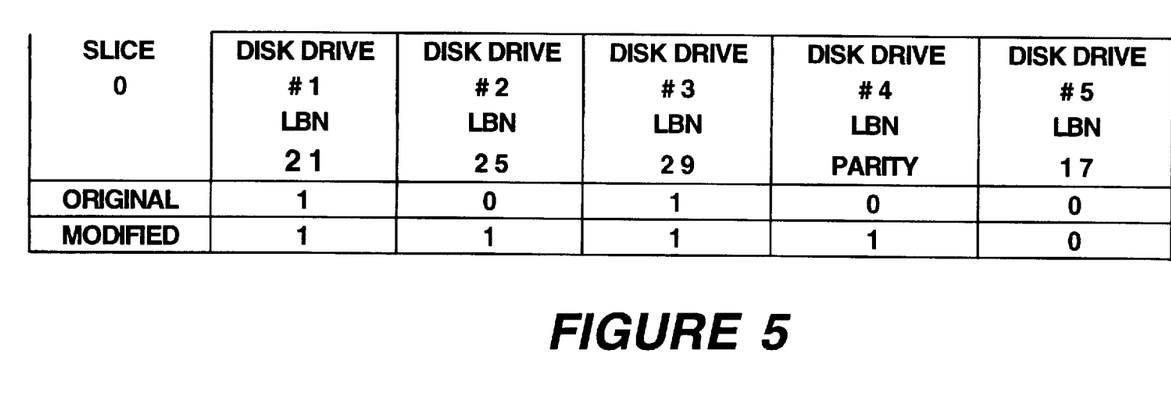
FIG. 5 is a table depicting how parity may change with the writing of new data into an array member.
Figure 6:
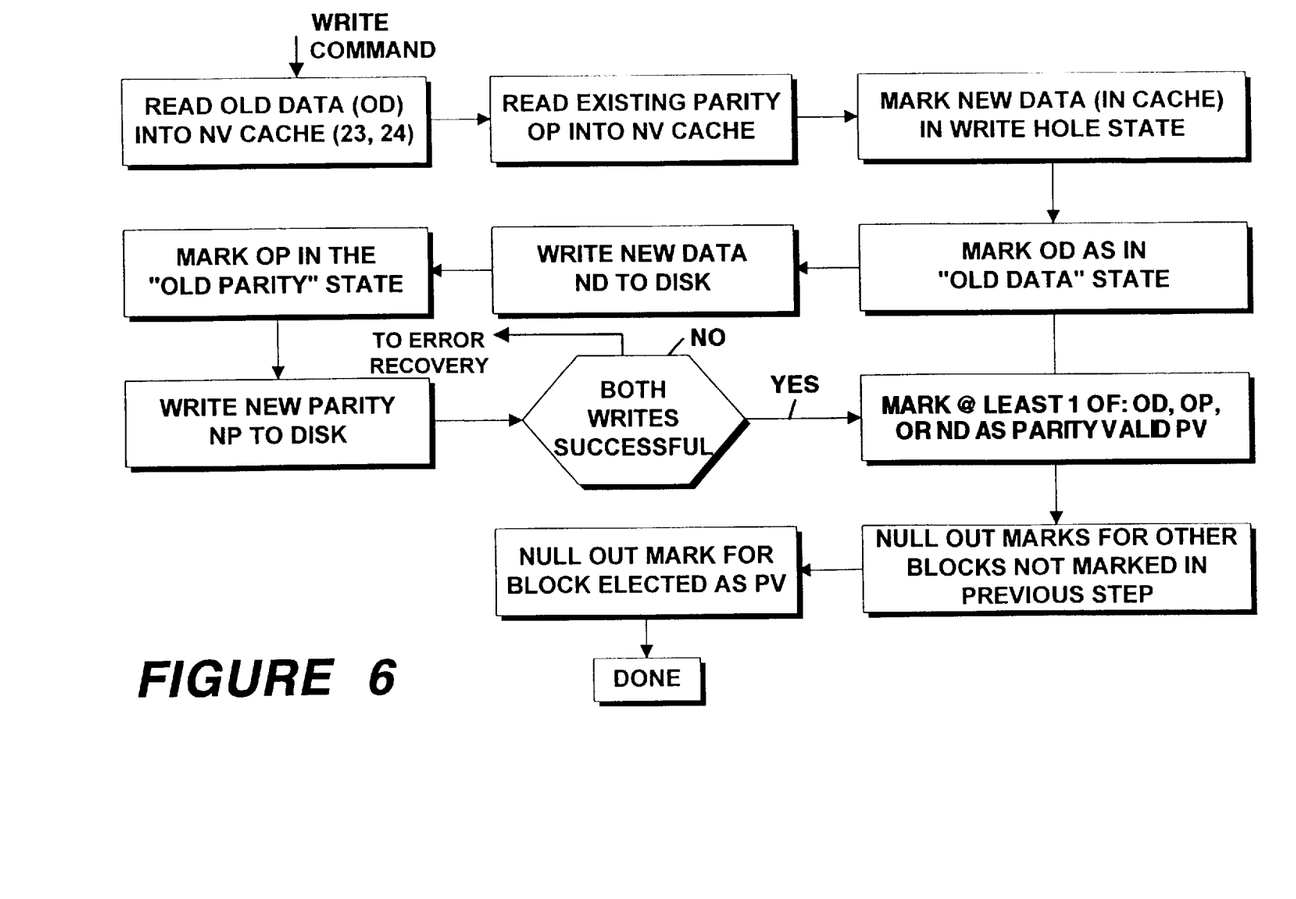
FIG. 6 is a flow chart illustrating the steps employed for a Read, Modify and Write (RMW) Algorithm using the novel techniques of the present invention to inhibit the formation of write holes.

To this end, and referring now to FIG. 6 which illustrates an improved flowchart for an RMW (Read, Modify and Write) the steps include additional information to that disclosed above with reference to FIG. 5. The steps are as follows, when a write command is issued:

1. Read old data (OD) into NV cache (23 or 24).
2. Read old (existing) parity (OP) into the NV Cache (23 or 24)
3. "Mark" new data (ND) as in the "Write Hole" (WH) (record) state (As will be discussed hereinafter, write to a cell which corresponds to a block-cache metadata entry).

4. "Mark" the old data (OD) as in the "old data" state.
5. Write the new data (ND)
6. Mark the old parity in the "Old Parity" (OP) state
7. Write new parity (NP).
8. When both writes succeed "Mark" at least one of the three blocks as "Parity valid" (PV) i.e. either the "old data" (OD), the "new data" (ND) or the old parity (OP). —This is done in case an interrupt (failure) occurs, which without more information the controller would think a write hole had occurred and some of the data had been lost, when in fact it has not been lost. The reason for the original marking is so that the new parity can always be found from Xoring the old data with the new data and then Xoring the result with the old parity state, as was shown in the example of FIG. 5.

9. Null out "marks" for "other" blocks
10. Null out "mark" for blocks containing the parity valid (PV)

The cache 23 and 24 includes a large amount of memory which may conveniently be divided into blocks, e.g. 512 bytes per block. Starting at the beginning of the cache, no matter what address it is, consider every 512 bytes a line chunk of memory, as being indexed in an array (the blocks arranged indexed in an array), which may be numbered consecutively for the number of blocks in the cache. The index is used to allow indexing into a table to record information about the contents of the block to which the index corresponds. Conversely, the table can be scanned to locate blocks in certain states which require error recovery in the event of a system failure (i.e., crash).

In this connection, by setting aside 8 bytes of data for each block on the disk for recording "cache metadata entry", which is indexed by block address converted to a unique integer, the state of any block in the cache may be determined. With a contiguous array of blocks, each having 512 bytes, this number is derived by simply taking the block address, subtract the base of the array, shift it right by 9 bits (same as divide by 512), each block will then have a unique integer associated therewith.

In the cache metadata entry, the following is preserved:

(1) the logical block address (LBA) on the disk, which is the address necessary for the drive controller to fetch or write the data.

(2) The device index, which indexes another table, which uniquely identifies the device. Now where the block is and where the data resides or should reside on the media is known.

(3) State of the data:
0=unused (free to write)
1=writeback—means that data needs to be written to the disk at some time in the future.
2=write hole—indicates that this block is dirty data, needs to be written to a member of a RAID set (either 3 or 5), but we are in the process of writing it to a RAID set which has parity (Raid sets 0 and 1 don't have parity) This means that the parity of the particular slice being written may be inconsistent on that particular slice, if the write hole is set.
3=this is old data
4=this is old parity—This is really equivalent to 3 because given the LBA and the device index (see (1) & (2) above, it is known which member and where it is, given the chunk size, whether this is parity data or not can be computed.
5=parity valid—Mark means we write to a cell which corresponds to the block, 1 cell maps to 1 unique block (cache metadata entry).

When a crash occurs, and the system reboots, this array is examined by the controller to determine if there is anything in the write hole state. The first operation that the controller does is to locate all the parity valid (PV). Then it nulls out any metadata of other blocks that fall in the same slice on the same raid set (that is what is meant in step 9 above of nulling out the "marks" for Other blocks), and subsequently nulls out the metadata marked parity valid.

The buffer indexes for the three blocks is also known. One of them is picked and a "parity valid" is stored into it (in fact the device index for the parity member, the LBA of the parity block, and a state which indicates "parity valid" is stored.) Then the other two may be nulled out, and finally the parity valid indication may be nulled out. Thus if a crash occurs after this is done, then that slice will be not effected by the crash unless one of the devices are wiped out and the data has to be reconstructed. In this manner the metadata information has been cleared of anything which would indicate, upon reboot of the system, that there is a problem to correct.

Suppose that a crash occurs before parity valid is set but write hole has been set, i.e everything is in cache memory (23 or 24), and both writes are about to be issued. In this case, the old data, the new data and old parity are all in cache memory. All that is necessary at that stage is to recompute the new parity by Xoring the old and new data and then Xoring the result with the old parity. This would create the new parity. The key then is to remember what has been done and in what state is the data.

The Write hole step is part of metadata. The write back step must be changed to write hole which tells us is that parity may be inconsistent and that new data destined for the specified disk block is present and where in the cache that block resides. The other pieces of data from the slice that are present give the entire picture. What data is present and how it is marked is a function of the algorithm being used. Assume that both reads (of old data and old parity) are issued essentially at the same time. If a crash occurs now, except that the new data is marked as being dirty and will eventually have to be written starting at the top of the algorithm in FIG. 6, there is nothing more to do.

Suppose that the old data read finishes first. Mark the old data as old data. If a crash occurs now, error recovery will simply clear the old data in the cache leaving the old data still on the media and this will be known because the new data hasn't yet been marked as write hole (WH). Suppose the new data has been marked WH and before marking the old data a crash occurs. In this instance, a write will be forced of the new data but because the old data cannot be found It will be assumed that the old data is still on the media (which it is). In this case, missing data may be reconstructed. Suppose both the old and new data are marked and a write is issued. If a crash occurs here the old parity is correct on the media but missing from the cache but may be fetched during recovery. Thus, in general, recovery action is dictated by which blocks from the slice are present in the cache and their states. The key to rewriting or insuring the proper data is written to the proper place after a fault, is that of knowing what pieces of data are available, and mark those before an operation is started that is destructive.

Figure 7:
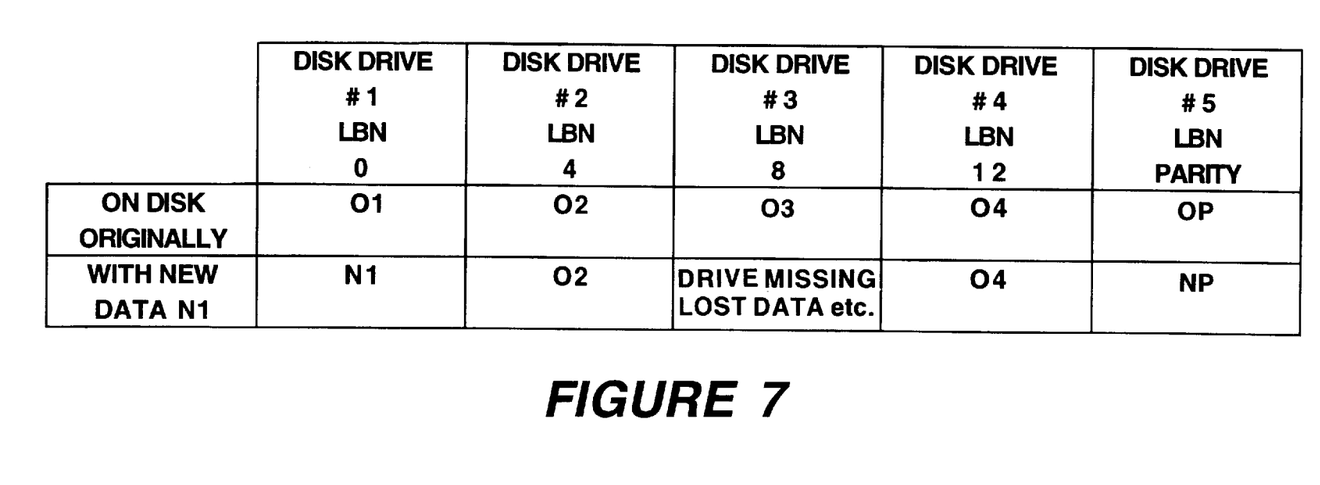
FIG. 7 is a table illustrating how either technique, RMW or reconstruct write (RW) algorithms may be employed in accordance with the invention.

In RMW, and referring now to FIG. 7, take for example that it is desired to write new data (N1) into LBN 0 in Disk Drive #1 replacing O1, which was originally in LBN 0. Further assume that Disk Drive #3 has failed or is missing (either before or after a power failure) and that data O3 is unavailable, i.e. it is not resident in cache. Further suppose that the crash occurred just after issuing writes of the new parity and new data N1. N1 will be marked as WH (write hole). You will also have in cache, O1 (old data) for LBN 0 as well as OP (old parity) for the previous parity as read from disks #1 and #5 respectively Subsequent to a crash, error recovery will recompute the new parity as the Xor of O1, N1, and OP and write it out to the appropriate disks along with new data N1. After these writes occur, the parity will be consistent again and error recovery will go through PV steps to clean up the metadata. It should be recognized that O3 will always be able to be computed unless another disk in the RAID set is lost. Before the write hole recovery, O3 is the Xor of O1, O2, O4 and OP. After write hole recovery, O3 is the Xor of Ni, O2, O4 and NP.

One more condition: suppose a spare drive had been put into missing Drive #3 but before the write error recovery takes place. O3 is computed as stated above, i.e. the Xor of O1, O2, O4 and OP, and then written to the replacement spare or substitute drive, and clear the FE bit that corresponds.

By way of further example, assume that Disk Drive #3 was present at the time of the power failure, but replaced with a spare just after reboot (or failover) and all the FE bits we re set to one. This is how the write hole is recovered:

The data in the cache is labelled as Ni, O1, and OP. The data on the disk is O2, O3 and O4. The steps may be considered as follows:
1. Determine the Metadata FE's for all members (O3 is the only one set).
2. Read O2 and O4.
3. Xor O1, O2, O4, Op to give O3.
4. Write O3 to Disk Drive #3,
5. Clear FE bit for O3
6. Xor O1, N1, OP to give NP
7. Redundantly mark O1 as O1, N1 as WH, and OP as OP.
8. Write N1 to Disk Drive #1 and NP to Disk Drive #5.
9. Do PV steps of marking @ least one of O1, OP or N1 as parity valid (PV).
10. Null out marks for "other blocks" not marked in 9 above, and;
11. Null out mark for block selected as PV in step 9.

Figure 8:
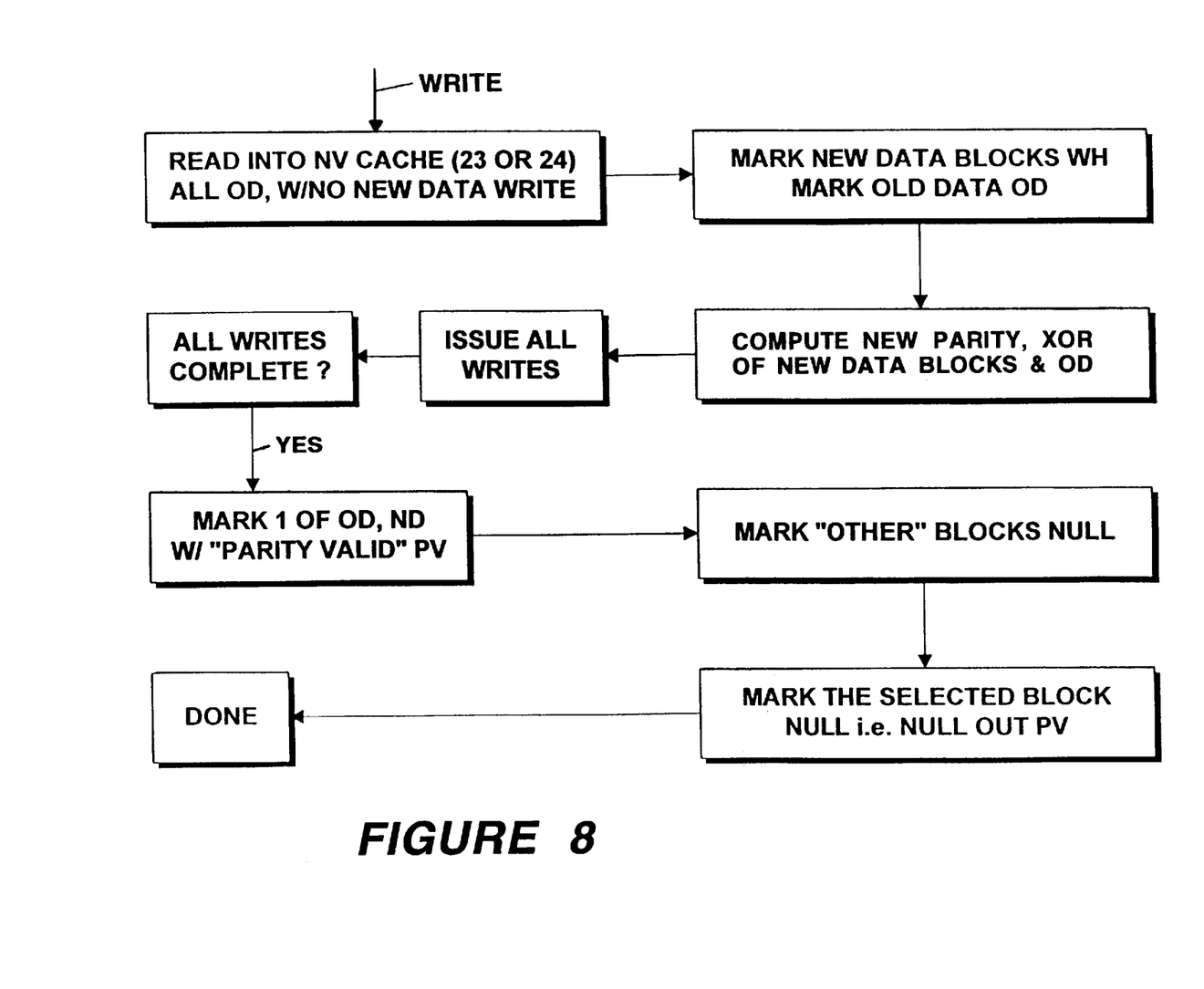
FIG. 8 is a flow diagram of the RW algorithm modified with the teachings of the present invention.

In a reconstruct write (RW) the situation is that of determining which data blocks are present (to be written) for each data block high slice and taking the following steps:

1. Read into cache all non-parity blocks (i.e. data blocks) of members for which there is no new data to write. When complete;.
2. Mark all new data blocks with "WH", and all old data blocks with "Old data". —when marked with WH, (write hole), this is saying (if crash occurs) that in process of writing; the data on the disk is unknown and must be treated as suspect.
3 Compute new parity as Xor of all new data blocks and any old data blocks read.
4. Issue writes of new data.
5. Issue write of new parity.
6. When all writes complete, mark one block (Old data, new data) "PV" (parity valid). Reason. If failure occurs at this point in time, when the system comes back up, it will scan the array for PV's. If it sees one, it will then null out anything in the same slice because it knows that what was written was complete.
7. Mark "other" blocks null. (Setting to 0 state, unused, free etc.)
8. Mark the selected block null (step 6.)

For recovery purposes, the important consideration is that before any writes are done, the old data is marked as well as the new data. This protects against loss of a drive since all of the data except parity is available after a crash. Thus, double failures are handled for this algorithm as well.

StorageWorks™ controller firmware developers, have automated Parity RAID management features rather than require manual intervention to inhibit write hole problems after failures. Controller-based automatic array management is superior to manual techniques because the controller has the best visibility into array problems and can best manage any situation given proper guidelines for operation.

Thus the present invention provides a novel method and apparatus for reconstructing data in a computer system employing a parity RAID data protection scheme. By employing a write back cache composed of non-volatile memory for storing (1) writes outstanding to a device, (2) selected "old data", and (3) storing metadata information in the non-volatile memory, it may be determined if, where and when the write was intended or did happen when the crash occurred. An examination is made to determine whether parity is consistent across the slice, and if not, the data in the non-volatile write back cache is used to reconstruct the write that was occurring when the crash occurred to insure consistent parity, so that only those blocks affected by the crash have to be reconstructed.

Although the invention has been described with a certain degree of particularity, it should be recognized that elements thereof may be altered by person(s) skilled in the art with out departing from the spirit and scope of the invention as hereinafter set forth in the following claims.

What is claimed is:

1. A method of reconstructing data in a computer system employing a Parity RAID protection scheme for a striped array of storage devices that employ parity recovery in the event of a crash, said computer system including a write back cache composed of non-volatile memory for storing (1) write data outstanding that is to be written to storage devices, and (2) metadata information; said metadata information comprising a first field containing an LBA of said write data outstanding, a second field containing device IDs that correspond to said write data outstanding, and a third field containing status that indicates consistent or inconsistent write slice parity, comprising the steps of:

storing old data in said non-volatile memory from storage devices that are intended for said write data outstanding, to protect said old data in the event a crash occurs during a write to a storage device;

storing old parity that corresponds to said old data in said non-volatile memory;

determining from said metadata information where a given write data outstanding was intended when a crash occurs;

determining whether parity is consistent across a write slice corresponding to said given write data outstanding, and if parity is not consistent, using said old data stored in said non-volatile memory and said the old parity stored in said non-volatile memory to reconstruct said given write data outstanding to thereby insure consistent parity, whereby;

only slices of said given write data outstanding whose parity is not consistent and are affected by the crash have to be reconstructed.

2. A method in accordance with claim 1 including the step of:

storing said write data outstanding in said non-volatile memory; and marking said stored write data outstanding with indicia indicating that said stored write data outstanding is in a write hole state.

3. A method in accordance with claim 2, including the step of:

marking said old data stored in said non-volatile memory as being in an old data state.

4. A method in accordance with claim 3, including the step of:

writing said write data outstanding to a designated storage device.

5. A method in accordance with claim 4, wherein said step of writing said write data outstanding to a designated storage device occurs subsequent to said step of storing said write data outstanding in said non-volatile memory.

6. A method in accordance with claim 5, including the steps of:

calculating a new parity for said write data outstanding; and writing said new parity to a storage device.

7. A method in accordance with claim 6 including the step of:

subsequent to writing said write data outstanding and said new parity to a storage device, marking at least one of said old data, said write data outstanding or said old parity as parity valid.

8. A method in accordance with claim 7, including the step of:

subsequent to said step of marking as parity valid, nulling out marks for other blocks that were not marked as parity valid by the step of claim 7.

9. A method in accordance with claim 8, including the step of:

subsequent to the step set forth in claim 8, nulling out said parity valid mark of claim 7.

10. For use in connection with a computer system, a method of reconstructing data in a Parity RAID protection scheme for attachment to said computer system, a write back cache composed of non-volatile memory for storing (1) write data that is outstanding to a storage device and associated old data read from a storage device, and (2) metadata information; said metadata information comprising a first field containing a LBA of said outstanding write data, a second field containing a storage device ID corresponding to said outstanding write data, and a third field containing a parity consistent/inconsistent status of data in said non-volatile memory, comprising the steps of:

determining from said metadata information a storage device for which said outstanding write data is intended;

storing in said non-volatile memory associated old data from at least areas on storage devices intended for outstanding write data, to protect said associated old data in the event a crash occurs during a write of said outstaxidinrg write data to a storage device;

determining whether parity is consistent across a data slice that includes said LBA, and if not using data stored in said non-volatile memory to reconstruct a write of said outstanding write data that was in progress when a crash occurred to insure consistent parity, whereby;

only data slices that have inconsistent parity and that are affected by a crash have to be reconstructed.

11. A method in accordance with claim 10 including the steps of:

marking said write data that is outstanding to a storage device with indicia indicating that said write data that is outstanding to a storage device is in a write hole state.

12. A method in accordance with claim 11 including the step of:

marking said associated old data storing in said non-volatile memory as being in an old data state.

13. A method in accordance with claim 12, including the step of:

writing said write data that is outstanding to a storage device to a designated storage device.

14. A method in accordance with claim 13, including the steps of:

calculating a new parity for said write data that is outstanding to a storage device; and writing said new parity to a storage device.

15. A method in accordance with claim 14 including the step of:

subsequent to said step of writing said write data that is outstanding to a storage device to a designated storage device, and said step of writing said new parity to a storage device, marking at least one of said write data that is outstanding to a storage device or said new data as being parity valid.

16. A method in accordance with claim 15, including the step of:

subsequent to said parity valid marking step as set forth in claim 15, marking null blocks that are not marked parity valid.

17. A method in accordance with claim 16, including the step of:

subsequent to said marking null step as set forth in claim 16, nulling said parity valid marks.

18. In a computer system employing a Parity RAID protection scheme, and an array set of disk drives connected to said computer system, said disk drives containing data written thereon in a predetermined and proscribed format of data blocks:

a controller having a write back cache composed of non-volatile memory, said non-volatile memory being disposed intermediate said array set of disk drives and said computer system;

said non-volatile memory storing (1) data block writes outstanding to a disk drive, (2) associated data read from a disk drive, and (3) metadata information concerning information contained on said disk drives;

said metadata information comprising a first field containing an LBA of the associated data read, a second field containing a disk drive ID, and a third field containing a block status of data blocks contained on said disk drives;

a program contained within said controller for determining from said metadata information where a write is intended prior to a write being made to a disk drive of said array set; and means in said controller for determining whether parity is consistent across a slice of multiple data blocks written on a disk drive, and if not using data stored in said non-volatile memory to reconstruct a write to insure consistent parity, whereby reconstruction of data slices is necessary only for those slices on said set of disks drives for which inconsistent parity is determined.

19. In combination:

a computer having a central processor;

an array of disk drives comprising computer-readable disk memory having a surface formed with a plurality of binary patterns constituting an application program that is executable by said computer;

a controller connected intermediate said array of disk drives and said central processor;

said disk drive array in conjunction with said controller employing a Parity RAID protection scheme;

a non-volatile cache contained within said controller;

said controller effecting reading and writing of data blocks from and to said array of disk drives;

said application program including instructions for a method of reconstructing data slices in said disk drive array;

said application program including instructions for reading into said non-volatile cache (1) writes outstanding to a disk drive, (2) associated data read, and (3) metadata information concerning said disk drive array;

said metadata information comprising a first field containing LBAs of data blocks, a second field containing disk drive IDs, and a third field containing data block status;

said application program including instructions for determining from said metadata information to which disk drive a write is intended;

said application program including instruction for determining whether parity is consistent across a data block slice, and if not using data in said non-volatile cache to construct or to reconstruct write data, when necessary, to insure consistent parity, whereby only data block slices effected by inconsistent parity will have to be constructed or reconstructed.

* * * * *